Figure 1:
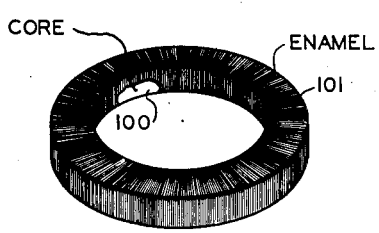
Figure 2:
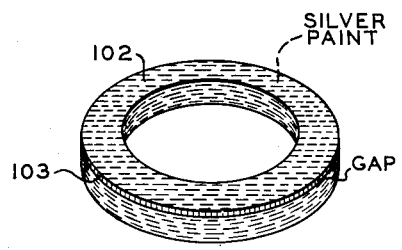

May 1, 1962 D. A. FLUEGEL 3,032,729
TEMPERATURE STABLE TRANSFORMER
Filed May 16, 1957

INVENTOR.
D. A. FLUEGEL
BY Hudson & Young
ATTORNEYS

United States Patent Office 3,032,729
Patented May 1, 1962

3,032,729
TEMPERATURE STABLE TRANSFORMER
Dale A. Fluegel, Bartlesville, Okla., assignor to Phillips Petroleum Company, a corporation of Delaware
Filed May 16, 1957, Ser. No. 659,683
4 Claims. (Cl. 336—84)

This invention relates to an improved transformer. In one aspect, the invention relates to a transformer with increased insensitivity to temperature variations. In another aspect, the invention relates to increasing the insentivity of a transformer to temperature variations by substantially reducing the capacitance between the secondary and ground. In yet another aspect, the invention relates to an improved transformer for use in circuits for the detection and analysis of materials in terms of the dielectric properties thereof.

The measurement of the dielectric properties of test materials has become a valuable industrial and laboratory procedure. A detecting element in the form of an electrical condenser is disposed so that the material to be measured forms the dielectric. A measurement of the capacitance of the condenser thus provides information regarding the properties of the test material. This procedure can be employed to detect liquid levels, the moisture content of the materials, the composition of materials, and the thickness of sheets of materials, for example. The accuracy of the measurement depends to a large extent on the accuracy of the measurement of the capacitance of the resulting condenser.

The capacitance of a condenser normally is measured by some type of alternating current electrical bridge network. The econdenser being measured forms one arm of the bridge network. However, it has been found that commercially available apparatus which is adapted to measure capacitance is not satisfactory for extremely accurate measurements. It is believed that the principal errors result from the effects of ambient temperature changes on the bridge circuit and associated components.

In accordance with the present invention, there is provided a novel transformer having increased insensitivity to temperature variations. The transformer of the invention is particularly suitable for use in circuits for measuring capacitance in an accurate manner. The primary and secondary windings of the transformer are mounted on an insulating casing which encloses a toroid core. The transformer is carefully shielded to minimize capacitance between the windings and ground.

Accordingly, it is an object of this invention to provide a novel transformer which is not sensitive to temperature changes. Another object of this invention is to provide an improved transformer for use in detecting and analyzing materials in the terms of the dielectric properties thereof. Another object of this invention is to provide an improved transformer for use in apparatus for measuring the capacitance of a condenser.

Other aspects, objects and advantages of the invention will be apparent from a study of this disclosure, the drawing and the appended claims.

In the drawing, FIGURES 1–6 illustrate details of construction of the transformer of the invention.

Figure 3:
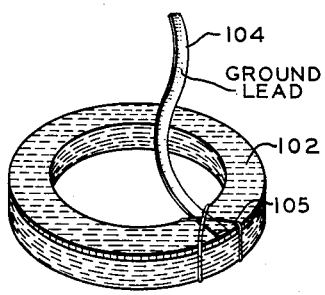
Figure 4:
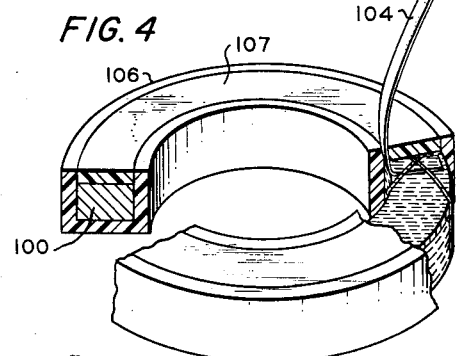

The core of the transformer comprises a toroid 100, see FIGURE 1, which can advantageously be formed of powdered iron which is compressed into the illustrated configuration. This core is painted with one or more coats of enamel 101 which form a layer of electrical insulation. A coat of silver paint or other conductive material 102 is then applied over the enamel. However, a narrow gap 103 is left unpainted to prevent a shorted turn on the transformer core. A gap having a width of approximately 1/32 to 1/16 inch has been found to be satisfactory. A ground lead 104 is attached to the core by a silk thread 105, as illustrated in FIGURE 3. In one specific embodiment of this invention, ground lead 104 was formed of a 200 x 200 mesh screen. The thread in the contact area of screen 104 is also painted with silver paint to insure a good electrical contact between lead 104 and paint 102.

Figure 5:
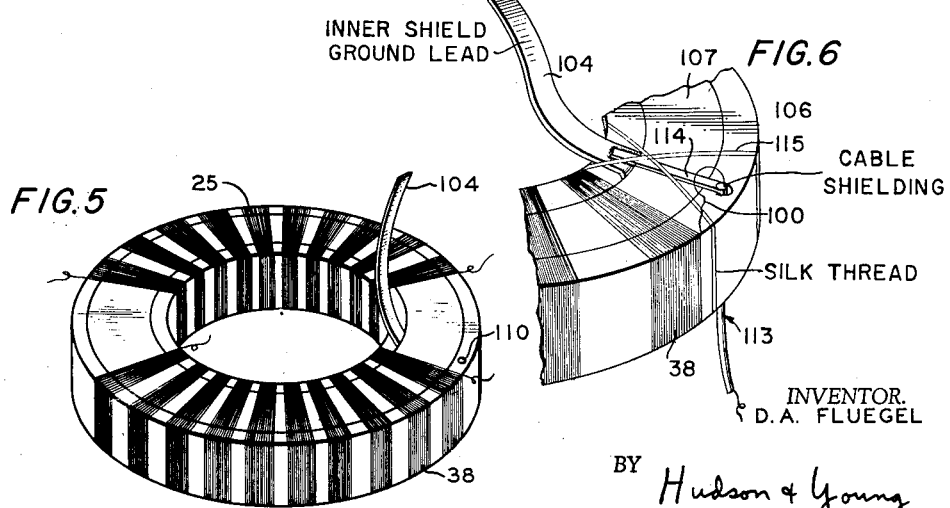

The core is then positioned within a case 106 which is formed of an insulting material. Teflon (polymerized tetrafluoroethylene) can be so employed to advantage. A cover 107 is inserted to complete the insulation about the core assembly. Ground lead 104 extends through an opening between case 106 and cover 107. A small hole 110 is drilled through case 106 adjacent ground lead 104, as shown in FIGURE 5.

The primary and secondary windings of the transformer are wound directly on the assembly formed by case 106 and cover 107. These windings are illustrated in FIGURE 5. In one specific embodiment of this invention, both the primary and the secondary windings comprised 10 closely wound segments of 17 turns each of No. 36 wire. It is important that the secondary winding be placed directly opposite the primary winding. The portions of case 106 between the two windings which are not covered must be of equal length. The primary and secondary windings are then painted with one or more coats of enamel which extends on case 106 slightly beyond both the primary and secondary windings. An alternative arrangement comprises extending these one or more coats of enamel to completely enclose the case and the windings. Ground lead 104 should not be painted. A coating of silver paint or other electrically conductive material is then added over the enamel so as to cover the primary winding only. It is important that the secondary winding not be so covered because this would increase the capacitance between the secondary winding and ground. This forms the outer grounded shield, and has a gap similar to that of the inner shield 102.

Figure 6:
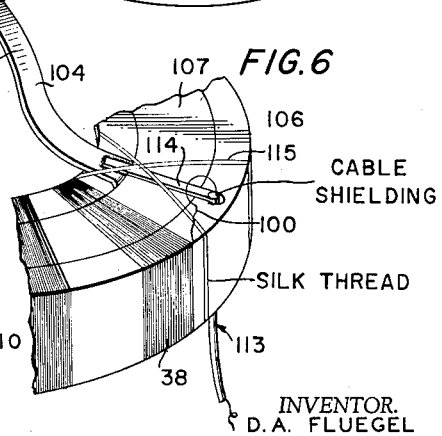

A coaxial cable 113 extends through hole 110 in case 106, see FIGURE 6. The shell 114 of cable 113 is connected to ground lead 104. One end terminal of the primary winding is connected directly to the outer shield of silver paint, and the second end terminal of the primary winding is connected to the central conductor of cable 113. Conductor 114 is secured in position by means of silk threads 115 which are then coated by silver paint. Thus, the inner and outer shields and one end terminal of the primary winding are grounded.

Case 106 serves to insulate the primary and secondary windings from the core 100. This case also insures that a stable dielectric material is interposed between the secondary windings and the electrostatic shield which is formed by the silver paint on core 100. The case is also of non-magnetic material. Teflon is particularly adapted for this purpose because of its good dielectric properties. The spacing provided by case 106 reduces the capacitance to ground of the windings, while the symmetrical construction assures that the capacitances from the ends of the secondary winding to ground are equal. Thus, dimensional changes of the case and changes in the dielectric constant as a function of temperature have the same effect on both windings and cancel one another. The net result is that there is no change in the bridge null balance due to temperature changes.

It should be evident from the foregoing description that there is provided in accordance with this invention an improved transformer which minimizes errors due to changes in ambient temperature and stray capacitance, such transformer being particularly suited for use in apparatus for measuring the capacitance of a test element in an accurate manner.

While the invention has been described in conjunction with a presently preferred embodiment, it should be evident that it is not limited thereto.

What is claimed is:

1. A transformer comprising a toroid of magnetic material, a first coating of non-conductive material completely enclosing said toroid, a second coating of conductive material enclosing said first coating except for a continuous gap extending completely around the toroid, a case of non-magnetic electrical insulation material completely enclosing the toroid having said first and second coatings thereon, a primary winding mounted on said case, a secondary winding mounted on said case directly opposite said primary winding, a third coating of conductive material completely enclosing said primary winding, and an electrical lead connected to said second and third coatings to maintain same at a common potential.

2. A transformer comprising a toroid of magnetic material, a first coating of non-conductive material completely enclosing said toroid, a second coating of conductive material enclosing said first coating except for a continuous gap extending completely around the toroid, a toroidal case of non-magnetic electrical insulation material completely enclosing the toroid having said first and second coatings thereon, a primary winding mounted on said case, a secondary winding mounted on said case directly opposite said primary winding, a third coating of non-conductive material completely enclosing said windings, a fourth coating of conductive material over said third coating completely enclosing said primary winding, and an electrical lead connected to said second and fourth coatings to maintain same at a common potential.

3. A transformer comprising a toroid of magnetic material, a first coating of non-conductive enamel completely enclosing said toroid, a second coating of metallic paint enclosing said first coating except for a continuous gap extending completely around the toroid, a toroidal case of a non-magnetic electrically insulating resin completely enclosing the toroid having said first and second coatings thereon, a first electrical lead extending from said second coating through said case, a primary winding mounted on said case, a secondary winding mounted on said case directly opposite said primary winding, a third coating of non-conductive enamel enclosing said windings, a fourth coating of metallic paint over said third coating completely enclosing said primary winding, but not said secondary winding, and means connecting said first lead to said fourth coating to maintain said second and fourth coatings at a common potential.

4. A transformer comprising a toroid of powdered magnetic metal, a first coating of non-conductive enamel completely enclosing said toroid, a second coating of metallic paint enclosing said first coating except for a continuous gap extending completely around the toroid, a toroidal case of polymerized tetrafluoroethylene completely enclosing the toroid having said first and second coatings thereon, a first electrical lead extending from said second coating through said case, a primary winding mounted on said case, a secondary winding mounted on said case directly opposite said primary winding, a third coating of non-conductive enamel enclosing said windings, a fourth coating of metallic paint over said third coating completely enclosing said primary winding, and means connecting said first lead to said fourth coating to maintain said second and fourth coatings at a common potential.

References Cited in the file of this patent

UNITED STATES PATENTS

| | | |
|---|---|---|
| 1,129,465 | Fortescue | Feb. 23, 1915 |
| 1,176,559 | Hoxie | Mar. 21, 1916 |
| 1,548,022 | Casper et al. | Aug. 4, 1925 |
| 1,588,074 | White et al. | June 8, 1926 |
| 1,651,440 | Campbell | Dec. 6, 1927 |
| 1,774,856 | Van Deventer | Sept. 2, 1930 |
| 2,260,398 | Otte | Oct. 28, 1941 |
| 2,826,747 | Carey | Mar. 11, 1958 |

FOREIGN PATENTS

| | | |
|---|---|---|
| 419,284 | Great Britain | Nov. 7, 1934 |
| 488,349 | Great Britain | July 5, 1938 |
| 878,573 | France | Oct. 19, 1942 |